(12) United States Patent
Mandrioli et al.

(10) Patent No.: US 11,053,916 B2
(45) Date of Patent: Jul. 6, 2021

(54) METHODS AND SYSTEMS FOR OPERATING A WIND TURBINE

(71) Applicant: GE Renewable Technologies Wind B.V., Pa Breda (NL)

(72) Inventors: Leonardo Mandrioli, Hamburg (DE); Sebastia Roca Ferrer, Hamburg (DE)

(73) Assignee: GE Renewable Technologies Wind B.V., PA Breda (NL)

( * ) Notice: Subject to any disclaimer, the term of this patent is extended or adjusted under 35 U.S.C. 154(b) by 60 days.

(21) Appl. No.: 16/427,492

(22) Filed: May 31, 2019

(65) Prior Publication Data
US 2019/0368465 A1 Dec. 5, 2019

(30) Foreign Application Priority Data
May 31, 2018 (EP) ..................................... 18175352

(51) Int. Cl.
*F03D 9/00* (2016.01)
*H02P 9/04* (2006.01)
(Continued)

(52) U.S. Cl.
CPC ......... *F03D 7/0224* (2013.01); *F03D 7/0272* (2013.01); *F03D 9/25* (2016.05);
(Continued)

(58) Field of Classification Search
CPC ........ F03D 7/0224; F03D 7/0272; F03D 9/25; H02P 9/008
See application file for complete search history.

(56) References Cited

U.S. PATENT DOCUMENTS

| 9,714,641 B2 * | 7/2017 | Bagnara | ................... H02J 3/386 |
| 2015/0252787 A1 * | 9/2015 | Bagnara | ..................... H02P 3/22 |
| | | | 290/44 |

(Continued)

FOREIGN PATENT DOCUMENTS

| EP | 3 179 097 A1 | 6/2017 |
| WO | WO 2012/139584 A1 | 10/2012 |

OTHER PUBLICATIONS

EP Search Report, dated Nov. 12, 2018.
(Continued)

*Primary Examiner* — Tulsidas C Patel
*Assistant Examiner* — Thomas K Quigley
(74) *Attorney, Agent, or Firm* — Dority & Manning, P.A.

(57) ABSTRACT

Methods of operating a variable speed wind turbine in an event of a power set-point limitation are described. The methods may comprise determining whether the power set-point is below or equal to a theoretical capability of the wind turbine in accordance with prevailing wind conditions. If the power set-point is below the theoretical capability, operating the wind turbine to generate power according to the power set-point, including operating the wind turbine according to a generator torque and a generator rotor speed predefined for the power set-point. Each power set-point is defined by a combination of a generator rotor speed and a generator torque, the generator rotor speed ($\omega_{min}$, $\omega_1$, $\omega_2$, $\omega_{max}$) being outside an exclusion band.

12 Claims, 5 Drawing Sheets

(51) Int. Cl.
F03D 7/02 (2006.01)
F03D 9/25 (2016.01)
H02P 9/00 (2006.01)
H02P 101/15 (2016.01)

(52) U.S. Cl.
CPC .......... *H02P 9/008* (2013.01); *F05B 2270/20* (2013.01); *F05B 2270/327* (2013.01); *H02P 2101/15* (2015.01)

(56) References Cited

U.S. PATENT DOCUMENTS

2016/0305403 A1* 10/2016 Zheng .................. F03D 7/0224
2017/0067445 A1* 3/2017 Carulla ................ F03D 7/0296
2018/0245568 A1* 8/2018 Pedersen ................ G01M 7/00

OTHER PUBLICATIONS

Yang Jian et al.—Comparative Studies on Control Systems for a Two-Blade Variable-Speed Wind Turbine with a Speed Exclusion Zone, Energy, Elsevier, Amsterdam, NL, vol. 109, May 20, 2016, pp. 294-309.

* cited by examiner

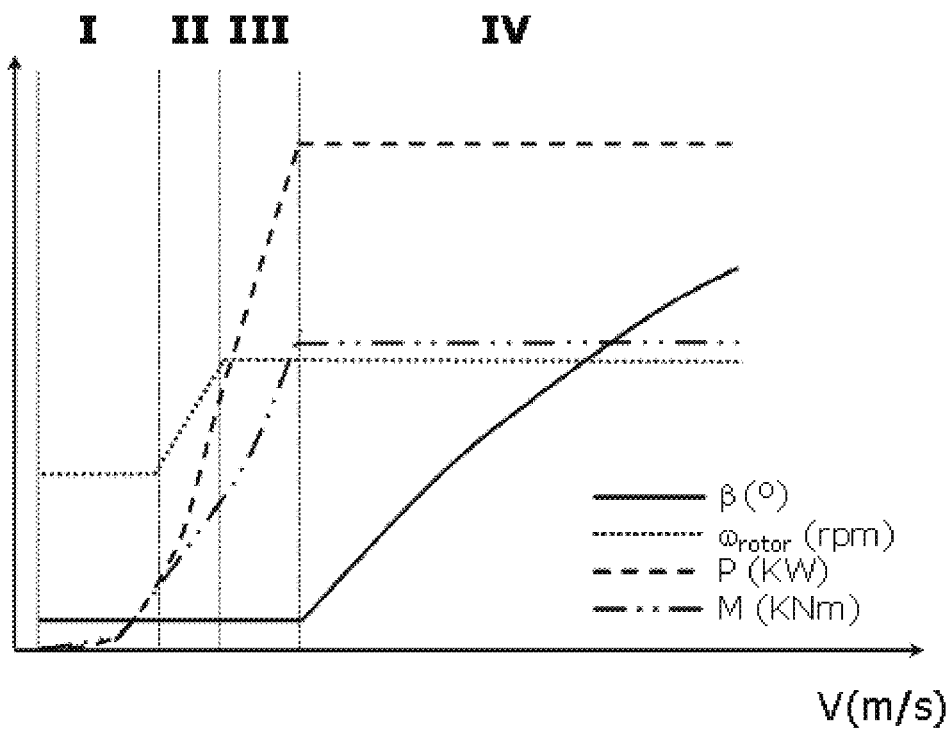
Figure 3 – PRIOR ART
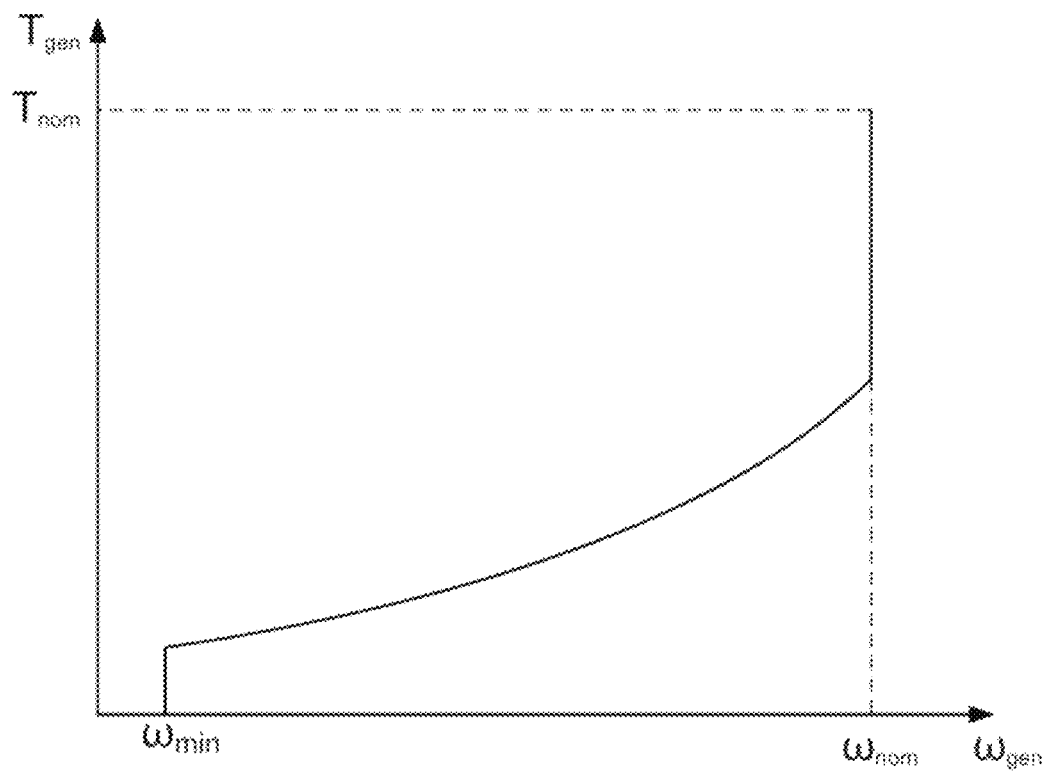
Figure 4 – PRIOR ART

METHODS AND SYSTEMS FOR OPERATING A WIND TURBINE

The present disclosure relates to methods and systems for operating a wind turbine. The present disclosure more specifically relates to methods and systems for operating a wind turbine according to a power set-point.

BACKGROUND

Modern wind turbines are commonly used to supply electricity into the electrical grid. Wind turbine blades are typically attached, at a blade root portion, to a rotor hub, either directly or through an extender, i.e. a cylindrical element arranged between the blade root portion and the hub to increase the diameter of the rotor swept area. The rotor is set into rotation under the influence of the wind on the blades. The rotation of the rotor shaft drives the generator rotor either directly ("direct drive" wind turbine) or through the use of a gearbox. The operation of the generator produces the electricity to be supplied into the electrical grid.

A variable speed wind turbine may typically be controlled by varying the generator torque and the pitch angle of the blades. As a result, aerodynamic torque, rotor speed and electrical power will vary.

A common prior art control strategy of a variable speed wind turbine is described with reference to FIG. 3 which represents a curve commonly known as "power curve" that describes the operation as a function of the prevailing wind speed. In FIG. 3, the operation of a typical variable speed wind turbine is illustrated in terms of the pitch angle ($\beta$), the electrical power generated (P), the generator torque (M) and the rotational velocity of the rotor ($\omega$), as a function of the wind speed.

Even though the wind speed is normally determined in an indirect manner by determining the rotor's rotational speed, e.g. by measuring the rotational speed of the generator, it may be regarded that the control is carried out as a function of the wind speed. Based on e.g. the rotational speed of the generator, the control may be implemented by varying the generator torque and/or the blade pitch angle.

In a first operational range, from the cut-in wind speed to a first wind speed (e.g. approximately 5 or 6 m/s), the rotor may be controlled to rotate at a substantially constant speed that is just high enough to be able to accurately control it. The cut-in wind speed may be e.g. approximately 3 m/s.

In a second operational range, from the first wind speed (e.g. approximately 5 or 6 m/s) to a second wind speed (e.g. approximately 8.5 m/s), the objective is generally to maximize power output while maintaining the pitch angle of the blades constant so as to capture maximum energy. In general, in the second operational range, the blades' pitch angle may be substantially constant, whereas in order to achieve the objective of maximum energy, the generator torque and thus the rotor speed may be varied so as to keep the tip speed ratio $\lambda$ (tangential velocity of the tip of the rotor blades divided by the prevailing wind speed) constant so as to maximize the power coefficient $C_p$.

In order to maximize power output and keep $C_p$ constant at its maximum value, the rotor torque may be set in accordance with the following equation:

$$T = k \cdot \omega^2,$$

wherein k is a constant, and $\omega$ is the rotational speed of the generator. In a direct drive wind turbine, the generator speed substantially equals the rotor speed. In a wind turbine comprising a gearbox, normally, a substantially constant ratio exists between the rotor speed and the generator speed.

This means that by maintaining the tip speed ratio $\lambda$ at a constant optimum value the power coefficient $C_p$ can be optimized in this operational range. The wind turbine blades are thus normally designed particularly for their operation in this range.

In a third operational range, which starts at reaching nominal rotor rotational speed and extends until reaching nominal power, the rotor speed may be kept constant, and the generator torque may be varied to such effect. In terms of wind speeds, this third operational range extends substantially from the second wind speed to the nominal wind speed e.g. from approximately 8.5 m/s to approximately 11 m/s.

In a fourth operational range, which may extend from the nominal wind speed to the cut-out wind speed (for example from approximately 11 m/s to 25 m/s), the blades may be rotated ("pitched") to maintain the aerodynamic torque delivered by the rotor substantially constant. In practice, the pitch may be actuated such as to maintain the rotor speed substantially constant. At the cut-out wind speed, the wind turbine's operation is interrupted.

In the first, second and third operational ranges, i.e. at wind speeds below the nominal wind speed (the sub-nominal zone of operation), the blades may be kept in a constant pitch position, namely the "below rated pitch position". Said default pitch position may generally be close to a 0° pitch angle. The exact pitch angle in "below rated" conditions however depends on the complete design of the wind turbine.

The before described example of operation may be translated into a so-called power curve, such as the one shown in FIG. 3. Such a power curve may reflect the optimum operation of the wind turbine under ideal design conditions, i.e. the theoretical/design operational curves for the pitch angle ($\beta$), rotor rotational speed ($\omega$), electrical power generated (P) and generator torque (M) in steady-state conditions, as a function of the wind speed.

In the supra-nominal zone of operation in accordance with this example of operation, i.e. at winds speeds at or above the nominal wind speed, the maximum available energy in the wind stream is very consciously not captured. That is, the blades are actively pitched to a position in which they "catch" less wind, and generate less torque than possible. This is mainly done to limit the structural loads on the wind turbine.

FIG. 4 illustrates the generator torque (Tgen) versus the generator speed ωgen corresponding substantially to the wind turbine operation shown in FIG. 3. A first vertical stretch corresponds to the first operational range, just above cut-in, in which the rotor rotational speed may be controlled to be substantially constant.

The curved portion indicates that with increasing wind speed (below nominal wind speed), the speed of rotation of the generator rotor increases until nominal rotor speed is reached. At the same time, the generator torque is gradually increased.

At wind speeds above a wind speed corresponding to a nominal rotor speed, but below the nominal wind speed (i.e. using the same numbers as before, between 8.5 m/s and 11 m/s), the pitch angle of the blades may be kept the same, and control is carried out by increasing the generator torque. This corresponds to the vertical portion of the curve.

Once nominal wind speed is reached, the pitch of the blades is changed such as to keep the speed of rotation constant at the nominal rotor speed. Also the generator torque is kept constant. In FIG. 4, this range of operation corresponds to the end point of the curve, at the top right corner of the figure. This corresponds to a speed of rotation of ωN, the nominal generator rotor speed.

During operation of a wind turbine, its structure and components may undergo undesired movements, i.e. oscillatory or repeating displacements in any direction (fore-aft vibrations, side-to-side or lateral vibrations, longitudinal vibrations, torsional vibrations, . . . ) of any magnitude and of any frequency (high or low, constant or varying). If a wind turbine is subjected to these movements and vibrations during a prolonged period of time, fatigue damage may result.

Undesired movements may occur more easily at specific rotor speeds (rpms) that, depending on the particular configuration of the wind turbine, may induce structural resonance phenomena. In most circumstances, due to the inherent wind variability, modern variable speed wind turbines do not operate at such potentially dangerous rpms for a prolonged period of time. As turbulence occurs and the wind changes, the rpms are varied.

Wind turbines are often grouped together in so-called wind farms. A wind farm control is generally aimed at centrally managing and/or controlling the wind farm such that the wind farm as a whole generates, usually according to a planned power generation, a total power to be supplied to the grid. This centralized control of the wind farm may generate suitable individual commands or set-points for the individual control systems of each wind turbine to cause generation of a corresponding amount of active power. The total power generated by the wind farm then should substantially correspond to the active power planned for the wind farm as a whole.

In case of unplanned grid unbalances, a grid operator may issue one or more online requests for the wind farm to vary its power production for compensating said unbalances. Most grid unbalances may refer to an excess of power in the grid, in which case an online request may be generated by the grid operator for the wind farm to reduce the (active) power it is generating.

These online "corrections" may cause at least some of the wind turbines to generate less power than they could, which in most cases is achieved by reducing the rotational speed (rpms) of the rotor and will typically involve changing other settings such as pitch angles, generator torque as well.

Thus, wind turbines may be ordered to work in a range in which structural resonance might occur and structural failure or above expected fatigue damage might occur. Additionally, it may be necessary to maintain a wind turbine's operation in such a regime for a prolonged period of time. A wind variation, including e.g. turbulence, during this period does not necessarily influence the wind turbine's performance since the turbine is already producing less than it potentially could and the rotor rotational speed might be maintained at the same level even if wind speed variations occur.

Even though in this example, a power set-point limitation is imposed by the electrical grid, similar set-point limitations may occur e.g. in case of a fault in a wind turbine. A wind turbine control may limit the operation of a wind turbine to a specific maximum power when a fault occurs. Depending on the fault, the wind turbine may thus continue to operate until planned maintenance will take place in spite of the fault. It can thus still generate electrical power even if does not reach its rated (or "nominal") power. There can be a number of reasons or events in which a wind turbine has to operate according to a set-point limitation. These reasons may be internal or external to the wind turbine.

As wind turbines become larger and higher, and the blades become longer, there are more structural modes that may be excited in normal operation of the wind turbine, and there are more rotational speeds of the rotor that are to be avoided as a consequence.

SUMMARY

In accordance with a first aspect, a method of operating a variable speed wind turbine in an event of a power set-point limitation is provided. The wind turbine has a rotor with a plurality of blades and a generator and a wind turbine controller for controlling a torque of the generator and a pitch angle of the blades. The wind turbine has an operational rotor speed range extending from a minimum rotor speed to a maximum rotor speed, the operational rotor speed range including one or more exclusion bands of rotor speeds related to excitation of structural modes.

And the method comprises determining whether the power set-point is below or equal to a theoretical capability of the wind turbine in accordance with prevailing wind conditions, and if the power set-point is below the theoretical capability, then the method comprises operating the wind turbine to generate power according to the power set-point. Operation according to the power set-point includes operating the wind turbine according to a set-point generator torque and a set-point generator rotor speed predefined for the power set-point, wherein the set-point rotor speed is outside the exclusion bands.

In accordance with this aspect, only a limited range of generator rotor speeds is defined for operation in case of a set-point limitation. For each of the rotor speeds there may be a range of generator torques, i.e. for each of the possible rotor speeds, a power range is defined. In the case of power set-point limitation, the wind turbine period may be operated for a prolonged period of time at a specific rotor speed. Since allowed set-point rotor speeds are defined outside potentially problematic rotor speed ranges, and with these rotors the whole range of power set-points is covered, the wind turbine is only allowed to operate for a longer period of time (i.e. when operating according to a set-point limitation) at these selected rotor speeds. These rotor speeds may be selected to avoid the risk of exciting vibrational modes of the wind turbine. The risk or extent of fatigue damage and structural failure may thus be avoided or at least reduced.

In a further aspect, a variable speed wind turbine is provided comprising a rotor with a plurality of blades, a generator, and a wind turbine controller for controlling a torque of the generator and a pitch angle of the blades. The wind turbine controller is configured to operate the wind turbine according to a power set-point limitation, including determining whether the power set-point is below or equal to a theoretical capability of the wind turbine in accordance with prevailing wind conditions. If the power set-point is below the theoretical capability, operating the wind turbine to generate power according to the power set-point, including operating the wind turbine according to a set-point generator torque and a set-point rotor speed predefined for the power set-point. Herein each power set-point is defined by a combination of a set-point rotor speed and a set-point generator torque, the set-point rotor speed being one of a limited number of predefined rotor speeds.

In yet a further aspect, a method of operating a variable speed wind turbine as a function of wind speed, the wind turbine having a rotor with a plurality of blades and a generator, and the wind turbine having a predefined theoretical power curve defining a wind turbine power as a function of steady state wind speed. Each wind turbine power on the theoretical power curve is defined by a combination of theoretical generator torque and theoretical rotor speed. The method comprises operating the wind turbine according to the predefined theoretical power curve in absence of a power set-point limitation and in case of a power set-point limitation determining whether the set-point power is equal to or smaller than an instant power capability of the wind turbine according to the power curve. In case of positive result, the wind turbine is operated at the set-point power, at a set-point rotor speed that is different from the theoretical rotor speed for the set-point power.

"Steady state" as used herein with respect to the theoretical power curve refers to a theoretical state in which the wind speed does not vary. In reality, the wind speed will (almost) never be really constant, but for the theoretical operation of the wind turbine, the wind speed may be assumed to be constant and uniform. The term "steady state" is used to distinguish from transient wind conditions, e.g. wind gusts, or other significant changes in wind speed.

BRIEF DESCRIPTION OF THE DRAWINGS

Non-limiting examples of the present disclosure will be described in the following, with reference to the appended drawings, in which:

FIG. 3 shows a typical power curve of a wind turbine;

FIG. 4 shows the same power curve of FIG. 3, with the rotational speed of the rotor along a horizontal axis, and the generator torque along the vertical axis;

DETAILED DESCRIPTION OF EXAMPLES

Figure 1:
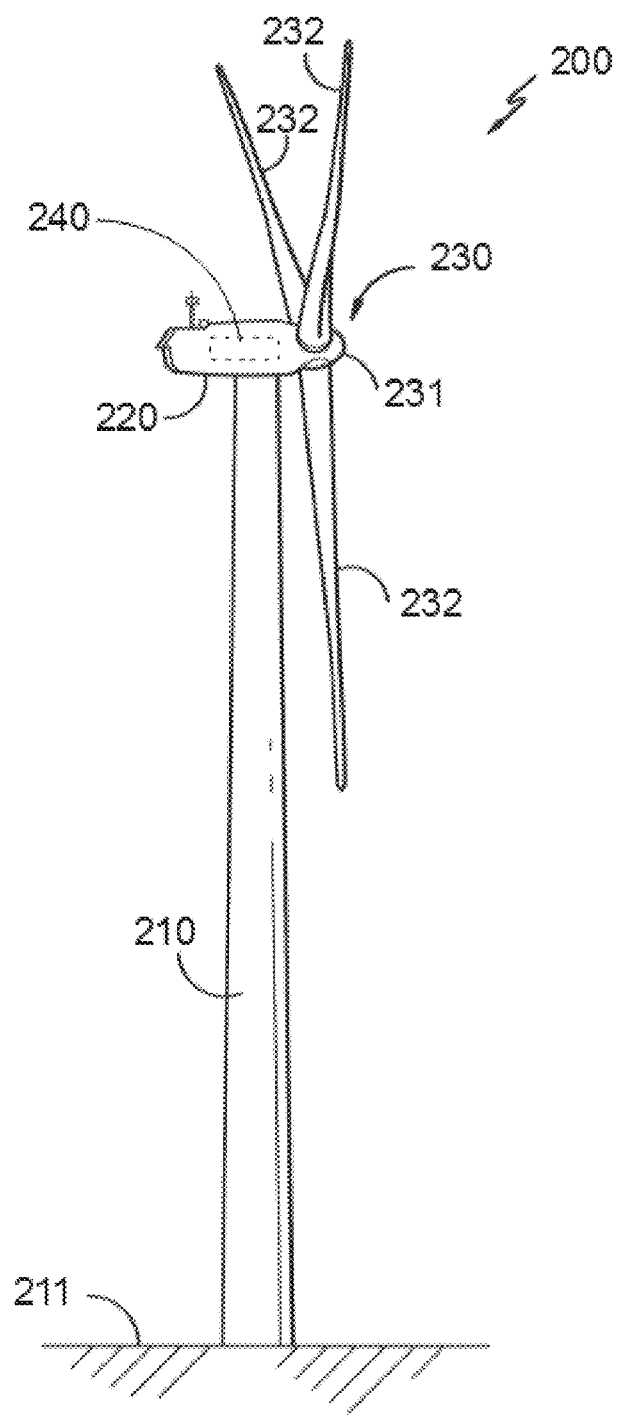
FIG. 1 illustrates a perspective view of one example of a wind turbine.

Reference will now be made in detail to examples, one or more of which are illustrated in the drawings. Each example is provided by way of explanation of the disclosure, not limitation of thereof. In fact, it will be apparent to those skilled in the art that various modifications and variations can be made without departing from the scope of the invention. For instance, features illustrated or described as part of one example can be used with another example to yield a still further example. Thus, it is intended that the present disclosure covers such modifications and variations as come within the scope of the appended claims and their equivalents.

FIG. 1 illustrates a perspective view of one example of a wind turbine 200. As shown, the wind turbine 200 includes a tower 210 extending from a support surface 211, a nacelle 220 mounted on the tower 210, and a rotor 230 coupled to the nacelle 220. The rotor 230 includes a rotatable hub 231 and at least one rotor blade 232 coupled to and extending outwardly from the hub 231. For example, in the illustrated embodiment, the rotor 230 includes three rotor blades 232. However, in an alternative embodiment, the rotor 230 may include more or less than three rotor blades 232. Each rotor blade 232 may be spaced about the hub 231 to facilitate rotating the rotor 230 to enable kinetic energy to be transferred from the wind into usable mechanical energy, and subsequently, electrical energy. For instance, the hub 231 may be rotatably coupled to an electric generator 221 (FIG. 2) positioned within the nacelle 220 to permit electrical energy to be produced.

The wind turbine 200 may also include a wind turbine controller 240 centralized within the nacelle 220. However, in other examples, the wind turbine controller 240 may be located within any other component of the wind turbine 200 or at a location outside the wind turbine. Further, the controller 240 may be communicatively coupled to any number of components of the wind turbine 200 in order to control the operation of such components and/or to determine the real accumulated fatigue of such components. In some examples, the controller may be further configured to perform a maintenance operation on a wind turbine component. In some examples, the wind turbine controller may be communicatively coupled to sensors for obtaining wind speed or turbulence intensity. The wind turbine controller will be explained in further detail below.

Figure 2:
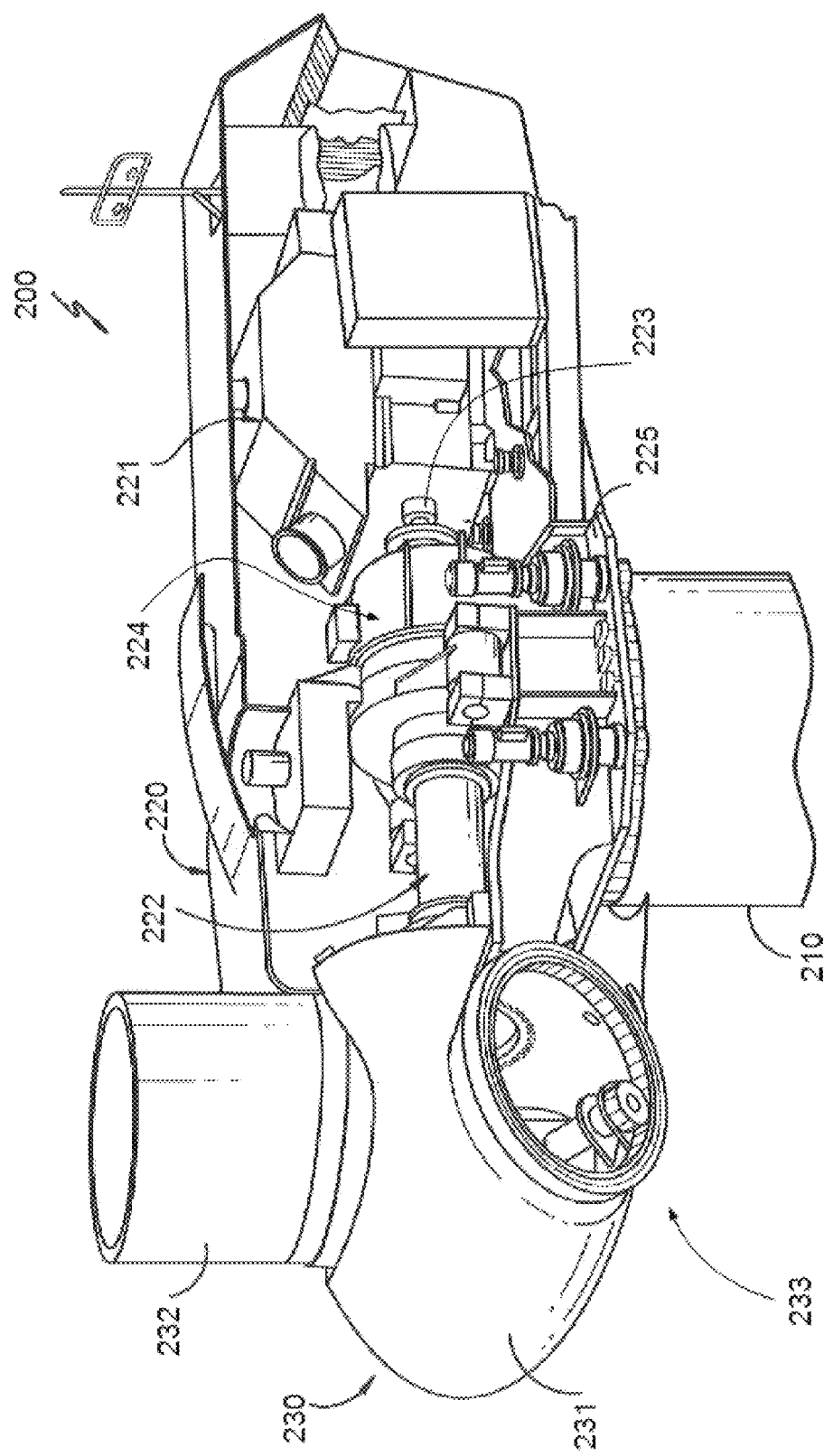
FIG. 2 illustrates a simplified, internal view of one example of the nacelle of the wind turbine of the FIG. 1.

FIG. 2 illustrates a simplified, internal view of one example of the nacelle 220 of the wind turbine 200 of the FIG. 1. As shown, the generator 221 may be disposed within the nacelle 220. In general, the generator 221 may be coupled to the rotor 230 of the wind turbine 200 for generating electrical power from the rotational energy generated by the rotor 230. For example, the rotor 230 may include a main rotor shaft 222 coupled to the hub 231 for rotation therewith. The generator 221 may then be coupled to the rotor shaft 222 such that rotation of the rotor shaft 222 drives the generator 221. For instance, in the illustrated embodiment, the generator 221 includes a generator shaft 223 rotatably coupled to the rotor shaft 222 through a gearbox 224. It should be appreciated that the rotor shaft 222, gearbox 223, and generator 221 may generally be supported within the nacelle 220 by a support frame or bedplate 225 positioned atop the wind turbine tower 210.

Blades 232 are coupled to the hub 231 with a pitch bearing in between the blade 232 and the hub 231 and may perform a relative rotational movement with respect to the hub 231 when the pitch system 233 is actuated.

As discussed before, FIG. 3 illustrates a power curve of a wind turbine describing operation of a wind turbine, and electrical power generation as a function of a wind speed. The same figure illustrates how the power curve translates into curves describing the pitch angle of the blades and the generator torque, as well as the rotor speed as a function of the wind speed.

FIG. 4 shows the same power curve of FIG. 3, with the theoretical rotational speed of the rotor along a horizontal axis, and the theoretical generator torque along the vertical axis. In the prior art, for each theoretical power set-point, there is a single combination of theoretical rotor speed and theoretical generator torque describing the operation of the wind turbine. In the prior art, in the case of a power set-point limitation therefore, a specific theoretical rotor speed may be maintained for a prolonged period. If this specific rotor speed happens to coincide with or be close to a problematic excitation frequency, structural failure or fatigue damage may occur.

In accordance with an aspect of the present disclosure therefore, at the set-point power, the wind turbine may be operated at a set-point rotor speed that is different from the theoretical rotor speed for that set-point power. I.e. for operation in accordance with a set-point imitation, one or more alternative power curves may be defined. These alternative power curves may only allow operation in selected sub-ranges of the total operational range of rotor speeds. These sub-ranges may be selected such that they are removed from rotor speeds which might cause increased structural responses. Prolonged operation in one of these sub-ranges will therefore not lead to structural failure or excessive fatigue damage.

The selected sub-ranges may be narrow, e.g. have a width of 1 rpm, or 0.5 rpm or less. In examples, multiple such separate sub-ranges may be defined. In some examples, the sub-ranges may be reduced to a single speed, so that operation in set-point limitation is only allowed at a limited number of rotational speeds.

Power curves that describe the operation of the wind turbine as a function of wind speed may be depicted in the torque/rotor speed plane as shown in FIG. 4. Instead of "power curve", these curves describing the operation of the wind turbine may also be called "torque curves".

Figure 5:
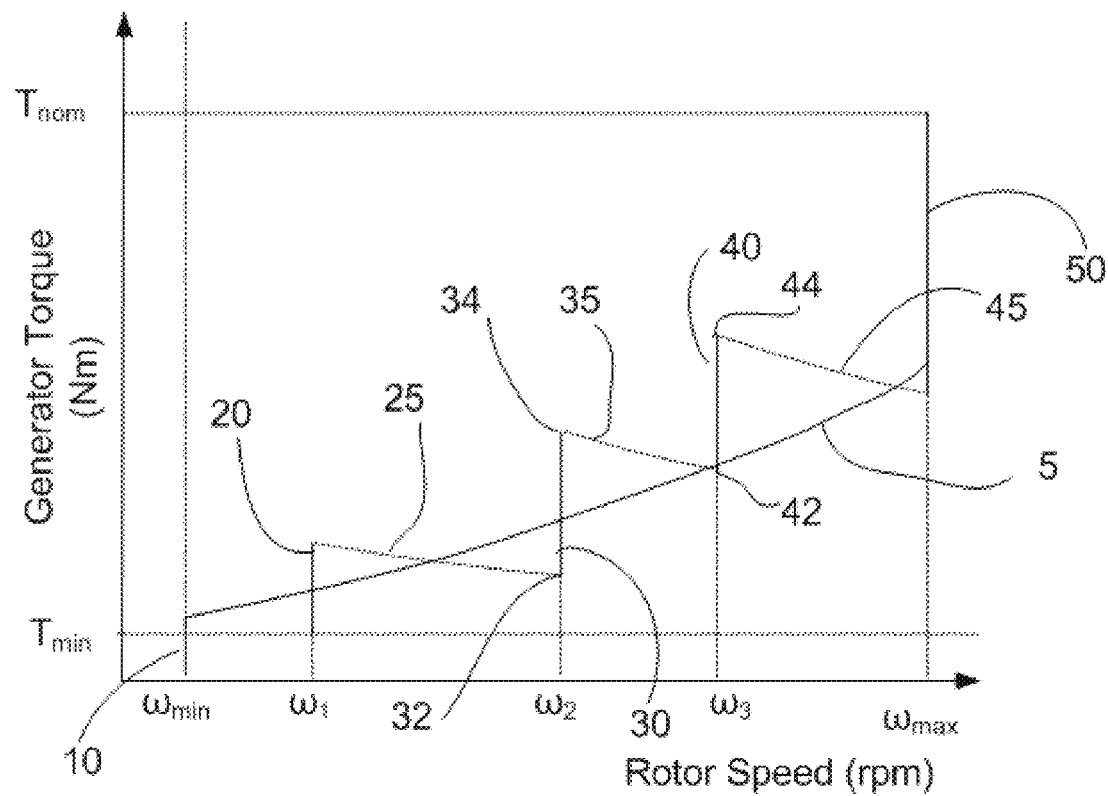
FIG. 5 shows an example of possible operations of a wind turbine according to different power set-points.

FIG. 5 shows an example of possible operations of a wind turbine according to different power set-points in an example of the present disclosure. FIG. 5 shows in the same figure, a traditional power curve (or "torque curve") comprising portions 10, 5 and 50. Vertical portion 10 corresponds to a first operational range at low wind speeds, in which a minimum rotor speed is maintained. Portion 5 corresponds to an operation of constant tip speed ratio. The rotor speed and generator torque are varied in such a way that an optimum tip speed ratio λ (tangential velocity of the tip of the rotor blades divided by the prevailing wind speed) is maintained so as to maximize the power coefficient $C_p$. In order to maximize power output and keep $C_p$ constant at its maximum value, the rotor torque may be set in accordance with the following equation:

$$T=k\cdot\omega^2,$$

wherein k is a constant, and ω is the rotational speed of the generator. In a direct drive wind turbine, the generator speed substantially equals the rotor speed. In a wind turbine comprising a gearbox, normally, a substantially constant ratio exists between the rotor speed and the generator speed. In examples, setting of rotor torque may also include the induced twist.

Vertical portion 50 corresponds to operation of a wind turbine at nominal rotor speed.

In addition to the normal operation (which would take place in the absence of a power set-point limitation), in FIG. 5 a method of operating a variable speed wind turbine in an event of a power set-point limitation is illustrated.

A limited number of predefined rotor speeds is shown, $\omega_{min}$, $\omega_1$, $\omega_2$, $\omega_3$ and $\omega_{max}$. In some examples, the number of predefined rotor speeds may be between two and eight (including the minimum rotor speed and nominal rotor speed), more specifically between three and six.

For each of the predefined rotor speeds, $\omega_{min}$, $\omega_1$, $\omega_2$, $\omega_3$ and $\omega_{max}$, a generator torque range is defined. These are indicated with reference signs 10, 20, 30, 40 and 50 respectively. Each possible power set-point up to nominal power may be defined by a combination of generator torque and rotor speed.

For rotor speed $\omega_2$ for example, generator torque may be varied between a minimum value 32 and a maximum value 34. For rotor speed $\omega_2$, power set-point range is defined between a minimum power (at torque value 32) and a maximum value (at toque value 34). Similarly, for rotor speed $\omega_3$, generator torque may be varied between a minimum value 42 and a maximum value 44. In this example, the maximum power for rotor speed $\omega_2$ (at torque value 34) corresponds to the minimum power for rotor speed $\omega_3$ (at torque value 44). The points are connected by isopower curves 25, 35 and 45 respectively, the isopower curves indicating combinations of generator torque and rotor speed resulting in the same generator power.

In this particular example, the power set-point ranges for each of the predefined rotor speeds do not overlap with each other. In alternative examples, the power set-point ranges might overlap. I.e. for certain set-points, there might be more than one combination of rotor speed and generator torque. Additional logic would be necessary to determine the most suitable combination on any occasion.

A method of operating the wind turbine in the case of a power set-point limitation may include determining whether the power set-point is below or equal to a theoretical capability of the wind turbine in accordance with prevailing wind conditions. If the power set-point is below the theoretical capability, then the wind turbine is operated the wind turbine according to the power set-point, i.e. according to the combination of generator torque and rotor speed predefined on any one of vertical lines 10, 20, 30, 40 and 50 for the power set-point.

In some examples, the limited number of predefined rotational speeds may be determined as a function of a Campbell diagram for the wind turbine. A Campbell diagram plot represents a system's response spectrum as a function of its oscillation regime. In the case of a wind turbine, tower fore-aft and sideways modes, flapwise and edgewise blade modes may be excited by different harmonics (1p, 3p, 6p etc.) of the rotor speed. Analysis of the Campbell diagram may reveal rotor speeds that may cause resonance phenomena. The rotor speeds for operation in the case of a power set-point limitation may thus be selected to avoid these potentially problematic rotor speeds.

In some cases, particularly offshore applications, the Campbell diagram may shift throughout the lifetime of a wind turbine, i.e. structural modes and frequencies may change over time. Accordingly, the exclusion bands of rotor speeds to be avoided during power set-point limitation may be redefined as well.

In some examples, the method may comprise receiving the power set-point limitation from a central control system or from a grid operator. For example, in the case of a problem in the electrical grid, the grip operator or grid code may prescribe operation in accordance with a reduced power set-point. Similarly, such a reduced set-point may be defined for a wind park comprising a plurality of wind turbines. A controller of the wind park may distribute the power requirement from the grid to the various wind turbines, defining a set-point for each of the individual wind turbines.

In some further examples, a wind turbine controller may determine the power set-point limitation. A local controller of a wind turbine (e.g. a SCADA) may determine a power set-point limitation in case of a fault in a component. This may allow the wind turbine to continue operation in spite of the fault until planned maintenance takes place.

In some examples, operating the wind turbine may further comprise operating according to a predefined power curve in the absence of a set-point limitation, the predefined power curve defining combinations of the pitch angles of the blades and the generator torque as a function of a wind speed. The predefined power curve may include curve 5 of substantially constant tip speed ratio. As long as the theoretical power capability (i.e. operation according to the power curve) of the wind turbine is below the power set-point, operation may continue to be normal, and only when the power capability of the wind turbine is above the power set-point, a switch may be made to one of the selected rotor speeds. Normal wind speed variation will ensure that the risk or resonance in normal operation is very low, whereas resonance may be avoided by properly selecting the plurality of rotor speeds $\omega_{min}$, $\omega_1$, $\omega_2$, $\omega_3$ and $\omega_{max}$.

Different methods for transitioning between operation according to the power curve ("normal operation") and the set-point limitation may be defined. Two examples of such transitions will be explained with reference to FIGS. 6 and 7.

Figure 6:
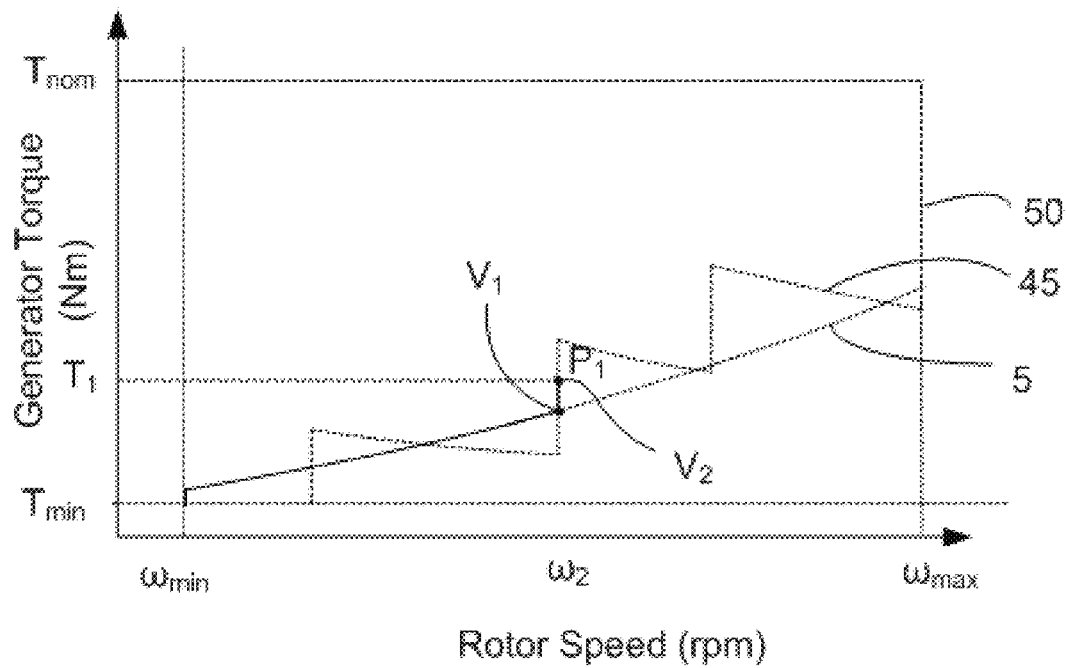
FIG. 6 shows an example of operation of a wind turbine including a transition toward a power set-point limitation.

FIG. 6 shows an example of operation of a wind turbine including a transition toward a power set-point limitation. In the particular example, illustrated the power set-point limitation is $P_1$. For set-point limitation to $P_1$, the rotational speed $\omega_2$ and generator torque $T_1$ have been predefined. As long as wind conditions are such that the power that the wind turbine might produce is below $P_1$, operation might substantially follow the original power curve, i.e. the original pitch and generator torque settings.

In some examples of operation, if the power set-point limitation is above the theoretical capability, the wind turbine may be operated according to the predefined power curve until a first wind speed $V_1$, and then transitioning to the power set-point for wind speeds above the first wind speed.

In some examples, operation may be "normal" (according to the predefined power curve), until one of the predefined rotor speeds is reached at the first wind speed. In the example of FIG. 6, $\omega_2$ may be reached at wind speed $V_1$. Then, transitioning may comprise maintaining the predefined rotor speed $\omega_2$ (as wind speed increases) and varying the torque until the power set-point is reached at a second wind speed $V_2$.

For wind speeds above wind speed $V_2$, the pitch angles of the blades may be varied to maintain the power set-point and to maintain the rotor speed constant. This operation may be regarded as comparable to the operation in the supra-nominal range of operation 50 according to the traditional power curve.

As may be seen in FIG. 6, a modified operational curve now describes the operation of the wind turbine. For wind speeds below $V_1$, the predefined power curve describes the operation. For wind speeds above $V_2$, the power set-point is maintained by maintaining rotor speed and generator torque constant. And a transition in between in which generator torque is increased to maintain constant rotor speed. Note that this transition may be particularly suitable for power set-points that lie above curve 5 representing an optimum power coefficient and tip speed ratio, i.e. the tip speed ratio is lower in the power set-point than in the case of the predefined power curve.

Figure 7:
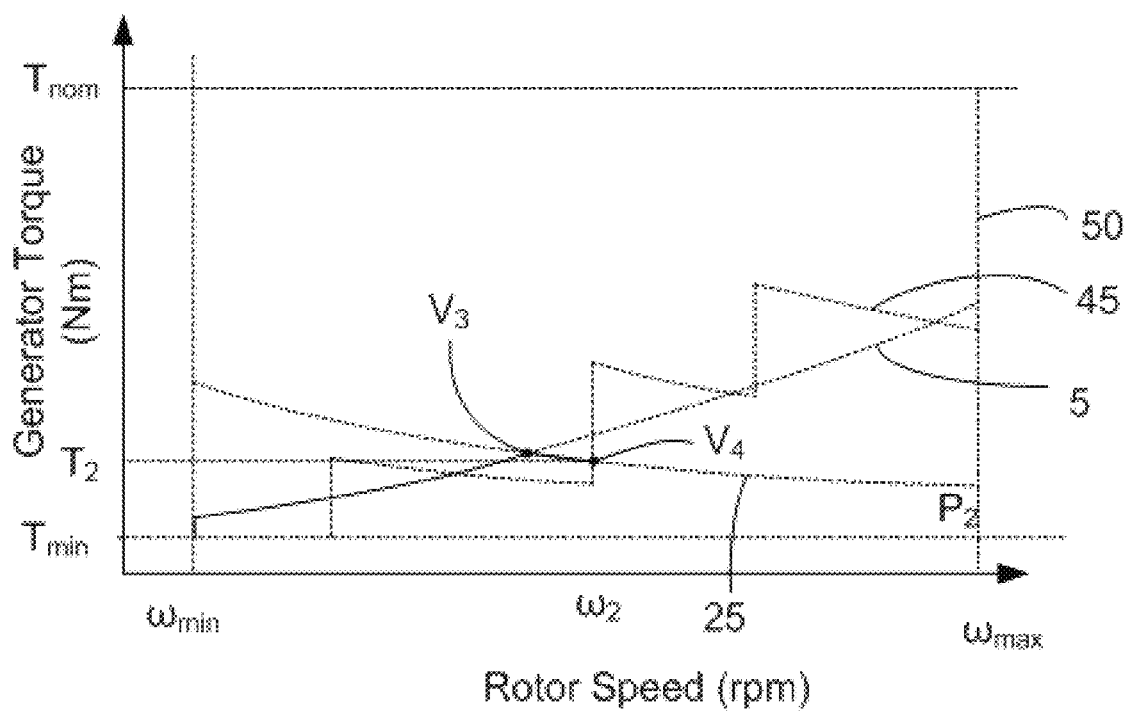
FIG. 7 shows a further example of operation of a wind turbine including a transition towards a power set-point limitation.

FIG. 7 shows a further example of operation of a wind turbine including a transition towards a power set-point limitation. During operation, a set-point $P_2$ is determined or received. For power set-point $P_2$, rotor speed $\omega_2$ and generator torque $T_2$ have been predefined.

In the example of FIG. 7, according to the predefined power curve, the power of set-point $P_2$ is reached at wind speed $V_3$. As wind speed increases, the traditional power curve (or "torque curve") is abandoned and transitioning comprises maintaining the power $P_2$ and increasing the rotor speed and reducing the generator torque until the power set-point is reached at a wind speed $V_4$. If wind speed increases further, the pitch angles of the blades may be varied to maintain the power set-point $P_2$ and to maintain the rotor speed constant.

In this example of FIG. 7, the transition between the predefined power curve (at wind speed $V_3$) and the power set-point (at wind speed $V_4$) occurs along an iso-power curve 25. During this transition, the pitch angles of the blades may be varied to control the rotor speed. And the generator torque may be varied as a function of the rotor speed to maintain constant power. This transition is particularly suitable of power set-points that fall below curve 5 of maximum power coefficient and optimum tip speed ratio.

Figure 8:
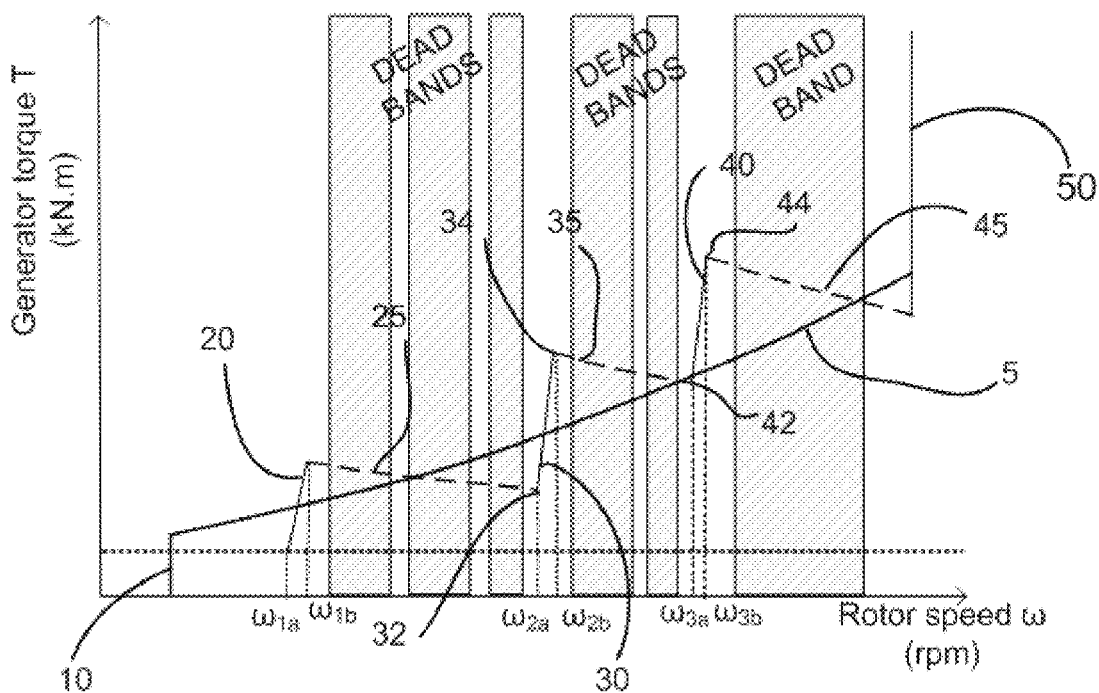
FIG. 8 illustrates a further example of defining operations according to different set-points.

FIG. 8 illustrates a further example of defining operations according to different set-points. A method of operating a variable speed wind turbine in an event of a power set-point limitation is illustrated. The wind turbine may have a rotor with a plurality of blades and a generator and a wind turbine controller for controlling a torque of the generator and a pitch angle of the blades.

The wind turbine may have an operational rotor speed range extending from a minimum rotor speed $\omega_{min}$ to a maximum rotor speed $\omega_{nom}$. The operational rotor speed range includes one or more exclusion bands of rotor speeds related to excitation of structural modes. In the example of FIG. 8, seven exclusion or "dead" bands are illustrated. It should be clear that there may be many more dead bands. In general, the number of dead bands may depend on the flexibility of the structure. The width of the dead bands may depend on how various structural modes interact and may reinforce each other and also on the extent of fatigue damage that may be defined as acceptable.

In offshore applications, because of interaction of foundation with the soil, structural modes may change over time. The dead bands may therefore be redefined periodically. In some examples, increased vibrations may be a trigger to redefine the dead bands. The dead bands might be redefined e.g. during planned maintenance through a change in the wind turbine controller (e.g. SCADA).

The method comprises determining whether the power set-point is below or equal to a theoretical capability of the wind turbine in accordance with prevailing wind conditions, and if the power set-point is below the theoretical capability, the wind turbine is operated to generate power according to the power set-point. This includes operating the wind turbine according to a set-point rotor speed and a set-point generator torque predefined for the power set-point, the set-point rotor speed being outside the exclusion bands.

The set-point rotor speed may be in one or more selected speed sub-ranges defined between the exclusion bands. Contrary to the previous examples, in FIG. 8, there are no limited number of rotational speeds, rather narrow sub-ranges are shown, extending e.g. from $\omega 1a$ and $\omega 1b$, and another range extending from $\omega 2a$ and $\omega 2b$.

The portions of the power curve with reference signs 10 and 50 are vertical as before, i.e. of constant speed. The portions of the power curve with reference signs 20, 30 and 40 are however not vertical as in the previous examples. The rotor speed is not exactly constant, but rather can vary in a narrow range. Each possible power set-point up to nominal power may be defined by a combination of generator torque and rotor speed.

For rotor speed range $\omega_{2a}$ to $\omega_{2b}$, for example, generator torque may be varied between a minimum value 32 and a maximum value 34. In this sub-range, power set-point range is defined between a minimum power (at torque value 32) and a maximum value (at toque value 34). Similarly, around rotor speed $\omega_3$, generator torque may be varied between a minimum value 42 and a maximum value 44. In this example, the maximum power for rotor speed $\omega_2$ (at torque value 34) corresponds to the minimum power for rotor speed $\omega_3$ (at torque value 44). The points are connected by isopower curves 25, 35 and 45 respectively, the isopower curves indicating combinations of generator torque and rotor speed resulting in the same generator power.

Even though in this example, lines 20, 30 and 40 are diagonal (i.e. of constantly increasing rotor speed and generator torque), this does not need to be the case. The lines 20, 30 and 40 may have different shapes. Instead of diagonal they may incorporate vertical and curved portions. In particular, in some examples, a portion may follow a part of the curve 5 of maximum power coefficient.

In a further aspect, of the present disclosure, a variable speed wind turbine is provided comprising a rotor with a plurality of blades, a generator, and a wind turbine controller for controlling a torque of the generator and a pitch angle of the blades. The controller may be configured to carry out any of the methods herein disclosed.

The wind turbine controller may include one or more processor(s) and associated memory device(s) configured to perform a variety of computer-implemented functions (e.g., performing the methods, steps, calculations and the like and storing relevant data as disclosed herein) according to any of the methods herein described. According to this aspect, the controller may perform various different functions, such as receiving, transmitting and/or executing wind turbine control signals, e.g. determining or receiving a power set-point limitation, and changing the control settings of the wind turbine in response to the set-point limitation. For example, the controller may be configured to control the blade pitch or pitch angle of each of the blades to control the power output generated by the wind turbine by adjusting an angular position of at least one blade relatively to the wind. As a result, the operation of the wind turbine may be up-rated or de-rated.

The controller may also include a communications module to facilitate communications between the controller and the components of the wind turbine. Further, the communications module may include a sensor interface (e.g., one or more analog-to-digital converters) to permit signals transmitted from one or more sensors to be converted into signals that can be understood and processed by the processors. It should be appreciated that the sensors may be communicatively coupled to the communications module using any suitable means as for example a wired connection or a wireless connection. As such, the processor may be configured to receive one or more signals from the sensors. Signals from one or more of the sensors may indicate a possible component failure. In response, a power set-point limitation may be activated.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor is also configured to compute advanced control algorithms and communicate to a variety of Ethernet or serial-based protocols (Modbus, OPC, CAN, etc.). Additionally, the memory device(s) may comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may be configured to store suitable computer-readable instructions that, when implemented by the processor(s), configure the controller to perform the various functions as described herein.

In particular, the limited number of predefined rotational speeds may be determined as a function of a Campbell diagram for the wind turbine.

In all the herein disclosed examples, whenever operation as a function of wind speed is described, this may involve measuring the wind speed (or an average wind speed over a rotor swept area) directly by using e.g. anemometers and/or a LIDAR or SONAR. However, it may also involve measuring the wind speed indirectly by e.g. measuring generator rotor speed or blade deflection.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A method of operating a variable speed wind turbine, the wind turbine having a rotor with a plurality of blades, a generator, and a wind turbine controller for controlling a torque of the generator and a pitch angle of the blades,
   the wind turbine having an operational rotor speed range extending from a minimum rotor speed to a maximum rotor speed, the operational rotor speed range including one or more exclusion bands of rotor speeds related to excitation of structural modes,
   the method comprising:
   operating the wind turbine according to a predefined power curve when there is an absence of a power set-point limitation, the predefined power curve defining combinations of the pitch angles of the blades and the generator torque as a function of a wind speed;
   in the event of a power set point limitation, determining whether a power set-point is below or equal to a theoretical capability of the wind turbine in accordance with prevailing wind conditions;
   when the power set-point is below the theoretical capability, operating the wind turbine to generate power according to the power set-point, including operating the wind turbine according to a set-point rotor speed and a set-point generator torque predefined for the power set-point, the set-point rotor speed being outside the exclusion bands; and
   wherein when the power set-point is above the theoretical capability, operating the wind turbine according to the predefined power curve until a first wind speed, and transitioning to the power set-point for wind speeds above the first wind speed.

2. The method of claim 1, wherein the set-point rotor speed is in one or more selected speed sub-ranges defined between the exclusion bands.

3. The method of claim 2, wherein the set-point rotor speed is one of a limited number of predefined rotor speeds.

4. The method of claim 3, wherein the limited number of predefined rotor speeds includes between two and eight predefined rotor speeds.

5. The method of claim 3, wherein for each speed sub-range, a power set-point is between a minimum power set-point and a maximum power set-point, wherein the maximum power set-point for a first speed sub-range is equal to a minimum power set-point for a second of the speed sub-ranges.

6. The method according to claim 1, wherein according to the predefined power curve, a set-point rotor speed is reached at the first wind speed, and the transitioning comprises maintaining the set-point rotor speed and varying the torque until the power set-point is reached at a second wind speed.

7. The method of claim 6, further comprising varying the pitch angles of the blades to maintain the power set-point for wind speeds above the second wind speed.

8. The method according to claim 1, wherein according to the predefined power curve, the power set-point is reached at the first wind speed, and the transitioning comprises maintaining the power and increasing the rotor speed and reducing the generator torque until the set-point rotor speed is reached at a second wind speed.

9. The method of claim 8, further comprising varying the pitch angles of the blades to maintain the power set-point for wind speeds above the first wind speed.

10. The method of claim 1, further comprising receiving the power set-point limitation from a central control system or from a grid operator.

11. A variable speed wind turbine comprising:
a rotor with a plurality of blades;
a generator operably connected with the rotor;
a wind turbine controller that controls a torque of the generator and a pitch angle of the blades;
the wind turbine controller further configured to:
  operate the wind turbine according to a predefined power curve in the absence of a power set-point limitation, the predefined power curve defining combinations of the pitch angles of the blades and the generator torque as a function of a wind speed;
  in an event of a power set-point limitation, operate the wind turbine according to the power set-point limitation, including determining whether the power set-point is below or equal to a theoretical capability of the wind turbine in accordance with prevailing wind conditions;
  when the power set-point is below the theoretical capability, operate the wind turbine to generate power according to the power set-point,
  wherein each power set-point is defined by a combination of a set-point rotor speed and a set-point generator torque, the set-point rotor speed being one of a limited number of predefined rotor speeds; and
  when the power set-point limitation is above the theoretical capability, operating the wind turbine according to the predefined power curve until a first wind speed, and transitioning to the power set-point for wind speeds above the first wind speed.

12. The wind turbine of claim 11, wherein the predefined rotor speeds have a plurality of associated power set-point ranges, and wherein none of the power set-point ranges overlap.

* * * * *